Aug. 30, 1927.
C. CARSON
1,641,116
LIQUID LEVEL INDICATOR
Filed Oct. 15, 1925
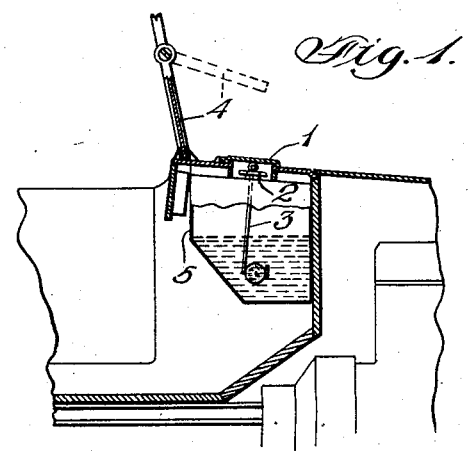
Fig. 1.
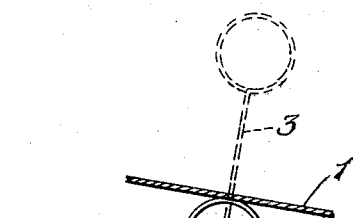
Fig. 2.
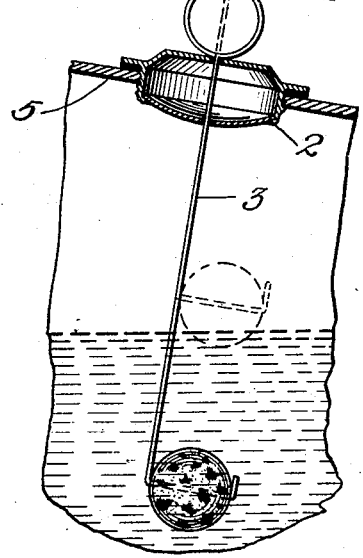
Inventor
Clark Carson
By Patented Aug. 30, 1927.

1,641,116

UNITED STATES PATENT OFFICE.

CLARK CARSON, OF LOS ANGELES, CALIFORNIA, ASSIGNOR TO MUNSON H. LANE, OF WASHINGTON, DISTRICT OF COLUMBIA.

LIQUID-LEVEL INDICATOR.

Application filed October 15, 1925. Serial No. 62,561.

This invention relates to fluid measuring devices and particularly for giving a generally practical measurement of the quantity of fuel used with internal combustion engines.

The principal object of the invention is to provide a very inexpensive gage which will give, with practical accuracy, (either by sight or in the dark by means of touch, thus obviating the danger of explosion through leakage and flame in proximity) an idea as to the amount of fuel remaining in the tank or the amount of fuel which may be used to fill it without overflowing.

A further object is to provide a gage which may be used in the tank of the 1926 model Ford cars, or a car which carries a fuel tank within the cowl of the body, without any alteration of the body or tank.

Another object of the invention as applied to the new 1926 model Ford cars, is to furnish a gage which may be operated from the front seat of the car without the necessity of getting out of closed cars, or open ones with the curtains up in rainy or windy weather and which will indicate to the operator while driving or in darkness the amount of fuel in the tank by the sense of touch alone. This is a very valuable feature as there is often a leakage due to splash at gages or caps, and open flame or lighted cigarettes are often used to illuminate under such dangerous conditions.

Being simple and durable in construction, this new combination offers a dependable gage under all conditions and also has the additional valuable advantage of acting as a retainer for the filling cap, so that it cannot be lost or forgotten through carelessness of service station attendants, while filling the gasoline tank.

The invention principally resides in the novel adaptation of the parts usually employed in fuel tanks and more particularly in the special combination of the unique construction in the 1926 model Ford cars, or other cars, with a rod having a float at its lower extremity (hereinafter referred to as a "floated rod" and treated as being one member) which offers a new and novel combination. Combined together they form a very inexpensive, reliable, safe and quick means of approximately ascertaining when the tank needs refilling and approximately how much fuel may be used without overflowing.

In the accompanying drawing,

Fig. 1 represents a fragmental centrally vertical longitudinal cross section through the fuel tank, cowl, dash, windshield, etc. of a 1926 model Ford, showing the combination of members which, taken together, form the gaging device when not in operation.

Fig. 2 represents a similarly taken section of more limited scope and on an enlarged scale and also shows, by dotted lines, a possible position of the gage when in operation as hereinafter described.

In the drawings the numeral 1 indicates a cowl tank cover, the numeral 2 denotes a fuel tank cap, and the numeral 3 designates the liquid level indicator. The fuel tank is indicated by the reference numeral 5.

In Fig. 1 the windshield is represented in opened position 4 by dotted lines.

The method of operation is as follows:—

Assuming a 1926 model Ford equipped with this device touring on a rainy night over a muddy country road and the operator uncertain as to the advisability of making a detour in order to obtain more fuel. He simply stops the car and with engine idling, opens the windshield, reaches out and raises the cowl tank cover 1. If the fuel tank contains more than a gallon or two, the floated rod 3 which has slidable bearing in the two holes drilled through the fuel tank cap 2 immediately rises as shown by dotted line position 3. The amount of rise of said rod the operator can gage by his sense of touch alone and without the necessity of a light or of dismounting from his seat, and thus knows instantaneously the approximate amount of fuel in the tank. If he finds the rod does not rise upon opening the cowl tank cover 1, he immediately knows, after testing to be sure by raising the rod and letting it drop back, that he must take the otherwise unnecessary side trip in order to obtain more fuel before continuing his journey.

He then, in either case, closes down the cowl tank cover. If the rod has risen, it is pushed back in position at the same time cowl tank cover is snapped into closed position in which it is held by a spring strong enough to always hold floated rod in its submerged position when not in operation.

If the operator drives into a service station for fuel the attendant opens the cowl cover and the gage immediately rises or remains in its lowest position, thus indicating to the operator the amount of fuel to order.

The fuel cap 2 is as easily unscrewed when rod 3 is in raised position as when submerged.

The cap being unscrewed, instead of being laid to one side on the cowl or away from the machine entirely where it may be misplaced or forgotten is held in a sloping position at the edge of the tank opening by the lower portion of floated rod which remains inside the tank. This position of the cap and floated rod assembly does not incumber the opening into the fuel tank and is not in the way of the funnel, can spout or regular service station hose nozzle. The cap and floated rod assembly thus remain in an unusually accessible position for screwing back into position when the tank has been filled, and cannot thus readily be lost or damaged.

Also, it is always available to measure the amount of fuel as the tank is being filled.

When the rod 3 rises only slightly or not at all, it warns the operator that there is only a small supply of fuel in the tank.

Having illustrated and described the preferred form of this invention, it is understood that various details of construction may be made without departing from the spirit of the invention. All changes are contemplated which are within the scope of the following claims.

I claim:—

In combination with an automobile cowl having a cowl opening, and a movable cover therefor, a fuel tank located within said cowl, an apertured tank cap located beneath the cowl cover, a liquid level indicator comprising a float having a rod attached thereto, said rod extending through said aperture in the tank cap, and rendered operative or inoperative as an indicator according as the cowl cover is open or closed.

In testimony whereof I affix my signature.

CLARK CARSON.